US012011936B2

(12) United States Patent
Woo et al.

(10) Patent No.: US 12,011,936 B2
(45) Date of Patent: Jun. 18, 2024

(54) DROPLET DISCHARGING DEVICE AND MANUFACTURING METHOD THEREOF

(71) Applicant: SEMES CO., LTD., Chungcheongnam-do (KR)

(72) Inventors: Jang Mi Woo, Chungcheongnam-do (KR); Ki Hoon Choi, Gyeonggi-do (KR); Young Hoon Jeong, Chungcheongnam-do (KR); Myung Jin Kim, Chungcheongnam-do (KR)

(73) Assignee: SEMES CO., LTD., Cheonan-si (KR)

( * ) Notice: Subject to any disclaimer, the term of this patent is extended or adjusted under 35 U.S.C. 154(b) by 166 days.

(21) Appl. No.: 17/947,084

(22) Filed: Sep. 17, 2022

(65) Prior Publication Data

US 2023/0211618 A1 Jul. 6, 2023

(30) Foreign Application Priority Data

Dec. 30, 2021 (KR) ........................ 10-2021-0192346

(51) Int. Cl.
*B41J 25/34* (2006.01)

(52) U.S. Cl.
CPC .................................... *B41J 25/34* (2013.01)

(58) Field of Classification Search
CPC ..... B41J 25/34; B41J 2202/19; B41J 2202/20
See application file for complete search history.

(56) References Cited

U.S. PATENT DOCUMENTS 7,036,906 B2 5/2006 Takano et al.
11,402,035 B2 8/2022 Haruna
2004/0075704 A1* 4/2004 Takano ................ G02F 1/1341 347/8
2010/0295896 A1* 11/2010 Albertalli ............... B41J 2/2135 347/37

(Continued)

FOREIGN PATENT DOCUMENTS

KR 10-2004-0012481 2/2004
KR 10-2004-0029562 4/2004
KR 10-2014-0020663 2/2014

(Continued)

OTHER PUBLICATIONS

Office Action dated Nov. 27, 2023 for Korean Patent Application No. 10-2021-0192346 and its English translation from Global Dossier.

*Primary Examiner* — Julian D Huffman
(74) *Attorney, Agent, or Firm* — Ladas & Parry, LLP

(57) ABSTRACT

The present disclosure provides a droplet discharging device capable of minimizing misalignment of a plurality of heads. The droplet discharging device comprises a base including a head fixing region to which a plurality of heads are fixed; a pack holder disposed on the base and including an opening penetrated by the plurality of heads installed on the base; a guide pin installed on the pack holder and protruding towards the base; a guide holder installed on the base and fastened to the guide pin; a first fastening part installed on the pack holder and protruding towards the base; and a second fastening part installed on the base and fastened to (Continued)

the first fastening part, wherein a lock air is supplied to one of the first fastening part and the second fastening part, thus fastening the first fastening part and the second fastening part.

18 Claims, 13 Drawing Sheets

(56) References Cited

U.S. PATENT DOCUMENTS

2024/0001697 A1 * 1/2024 Choi .......................... B41J 2/14

FOREIGN PATENT DOCUMENTS

| | | | |
|---|---|---|---|
| KR | 10-2018-0119625 | 11/2018 | |
| KR | 10-2020-0045099 | 5/2020 | |
| KR | 10-2020-0049111 | 5/2020 | |
| WO | WO-2014047513 A2 * | 3/2014 | ............ B41J 11/007 |

* cited by examiner

DROPLET DISCHARGING DEVICE AND MANUFACTURING METHOD THEREOF

CROSS-REFERENCE TO RELATED APPLICATION

This application claims priority from Korean Patent Application No. 10-2021-0192346 filed on Dec. 30, 2021 in the Korean Intellectual Property Office, and all the benefits accruing therefrom under 35 U.S.C. 119, the contents of which in its entirety are herein incorporated by reference.

BACKGROUND

1. Technical Field

The present disclosure relates to a droplet discharging device and a manufacturing method thereof.

2. Description of the Related Art

When a display device is manufactured, droplets are discharged onto a glass substrate using an inkjet facility to form an alignment film or a color filter.

In a conventional inkjet facility, multiple heads are installed on a U-shaped base to form a head pack. The head pack is inserted and fixed to an opening of a pack holder in the up-to-down direction. However, as the space between the plurality of heads, bases, and/or pack holders is very narrow, convection heat may stay in the space. The alignment of the plurality of heads may be distorted by the convection heat.

SUMMARY

Aspects of the present disclosure provide a droplet discharging device capable of minimizing misalignment of a plurality of heads.

Aspects of the present disclosure also provide a manufacturing method of a droplet discharging device capable of minimizing misalignment of a plurality of heads.

The technical aspects of the present disclosure are not restricted to those set forth herein, and other unmentioned technical aspects will be clearly understood by one of ordinary skill in the art to which the present disclosure pertains by referencing the detailed description of the present disclosure given below.

Technical Solution

According to an aspect of the present disclosure, there is provided a droplet discharging device, comprising: a base including a head fixing region to which a plurality of heads are fixed; a pack holder disposed on the base and including an opening penetrated by the plurality of heads installed on the base; a guide pin installed on the pack holder and protruding towards the base; a guide holder installed on the base and fastened to the guide pin; a first fastening part installed on the pack holder and protruding towards the base; and a second fastening part installed on the base and fastened to the first fastening part. A lock air is supplied to one of the first fastening part and the second fastening part, thus fastening the first fastening part and the second fastening part.

According to another aspect of the present disclosure, there is provided a droplet discharging device, comprising: a head frame; a pack holder fixed to the head frame and including an opening; a base fixed under the pack holder and including a head fixing region provided with a plurality of heads penetrating the opening; a plurality of guide pins and a plurality of air clamps installed on the pack holder and protruding towards the base; and a plurality of guide holders installed on the base and fastened to the plurality of guide pins, and a plurality of clamping blocks fastened to the plurality of air clamps. The head fixing region is rectangular in shape, the plurality of guide holders are installed closer to an apex of the head fixing region than the clamping blocks, the plurality of clamping blocks are installed closer to the corner of the head fixing region than the guide holders, a lock air is supplied to the air clamp to fasten the air clamp and the clamping block, and a release air is supplied to the air clamp to separate the air clamp from the clamping block.

According to an aspect of the present disclosure, there is also provided an manufacturing method of a droplet discharging device, comprising: preparing a head pack including a plurality of heads and a pack holder, wherein the head pack is fixed to a head fixing region of a base, a guide holder and a clamping block are installed around the head fixing region of the base, and an opening is installed in the pack holder and a guide pin and an air clamp are installed around the opening; disposing the head pack in a lower end of the pack holder; temporarily fastening the air clamp and the clamping block while fastening the guide pin and the guide holder; and completing a discharging module by supplying a lock air to the air clamp to fasten the air clamp and the clamping block.

Specific details of other embodiments are included in the detailed description and the drawings.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE EMBODIMENTS

Figure 1:
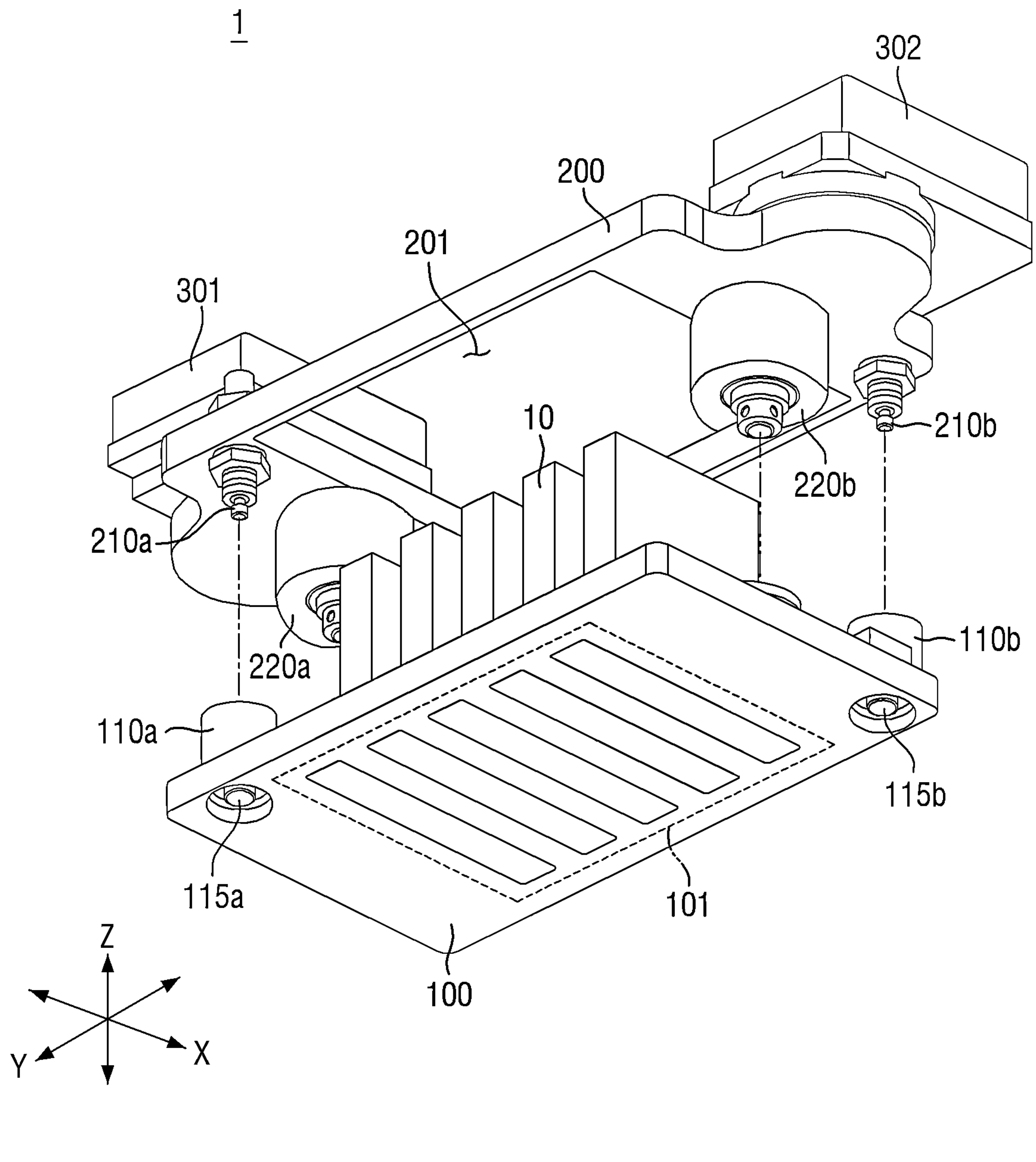
FIG. 1 is a diagram describing a droplet discharging device according to some embodiments of the present disclosure.

Hereinafter, embodiments of the present disclosure will be described with reference to the attached drawings. The merits and characteristics of the present disclosure and a method for achieving the merits and characteristics will become more apparent from the embodiments described in detail in conjunction with the accompanying drawings. However, the present disclosure is not limited to the disclosed embodiments, but may be implemented in various different ways. The embodiments are provided to only complete the disclosure of the present disclosure and to allow those skilled in the art to understand the category of the present disclosure. The present disclosure is defined by the category of the claims. Like numbers refer to like elements throughout the description of the figures.

The spatially relative terms "below," "beneath," "lower," "above," "upper" may be used to easily describe the correlation of a device or components with other devices or components. Spatially relative terms are to be understood as including terms in different directions of the device in use or operation in addition to the directions shown in the figures. For example, when flipping a device shown in the figure, a device described as "below" or "beneath" of another device may be placed "above" of another device. Thus, the exemplary term "below" can encompass both an orientation of above and below. The device can also be oriented in other directions, so that spatially relative terms can be interpreted according to orientation.

Although the first, second, etc. are used to describe various elements, components and/or sections, these elements, components and/or sections are of course not limited by these terms. These terms are only used to distinguish one element, component or section from another element, component or section. Therefore, the first device, the first component, or the first section mentioned below may be a second device, a second component, or a second section within the technical spirit of the present disclosure.

Hereinafter, preferred embodiments according to the present disclosure are described in detail with reference to the accompanying drawings. The same or similar elements are assigned the same reference numerals irrespective of their reference numerals, and a redundant description thereof is omitted.

Figure 2:
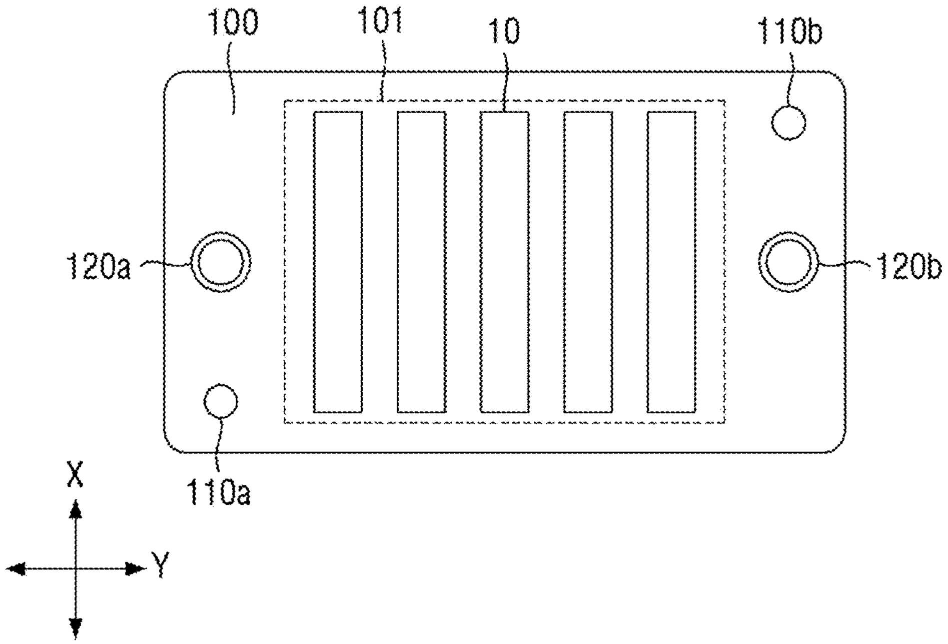
FIG. 2 is a top plan view of a base illustrated in FIG. 1.
Figure 3:
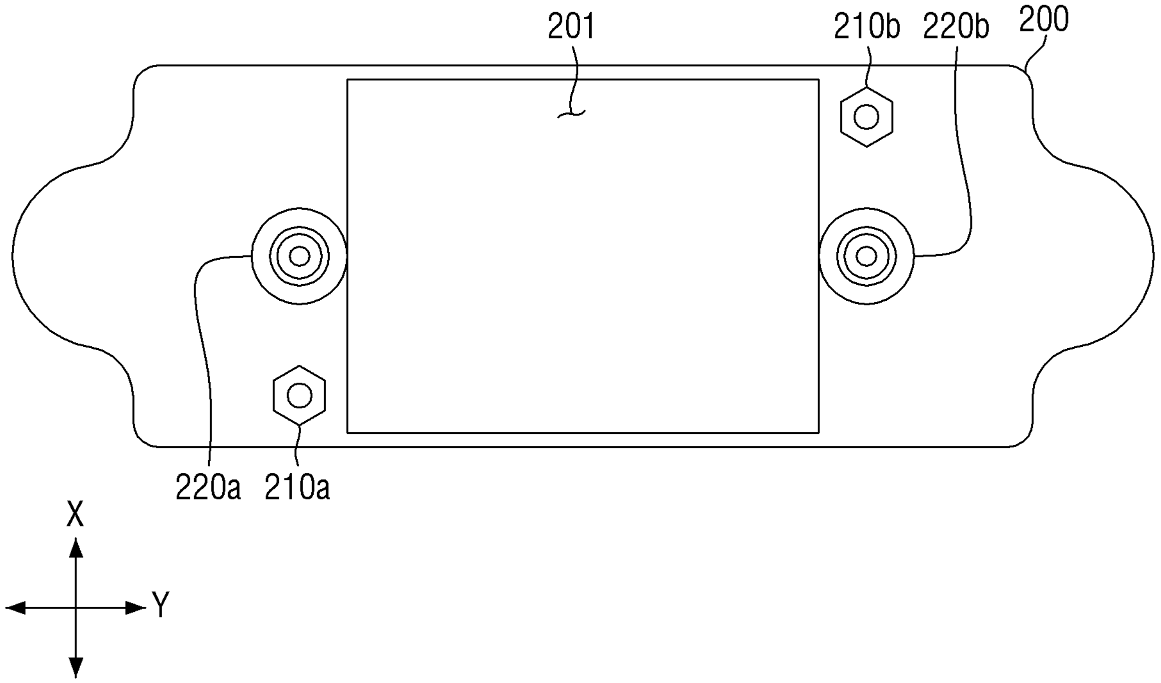
FIG. 3 is a bottom view of a pack holder illustrated in FIG. 1.
Figure 4:
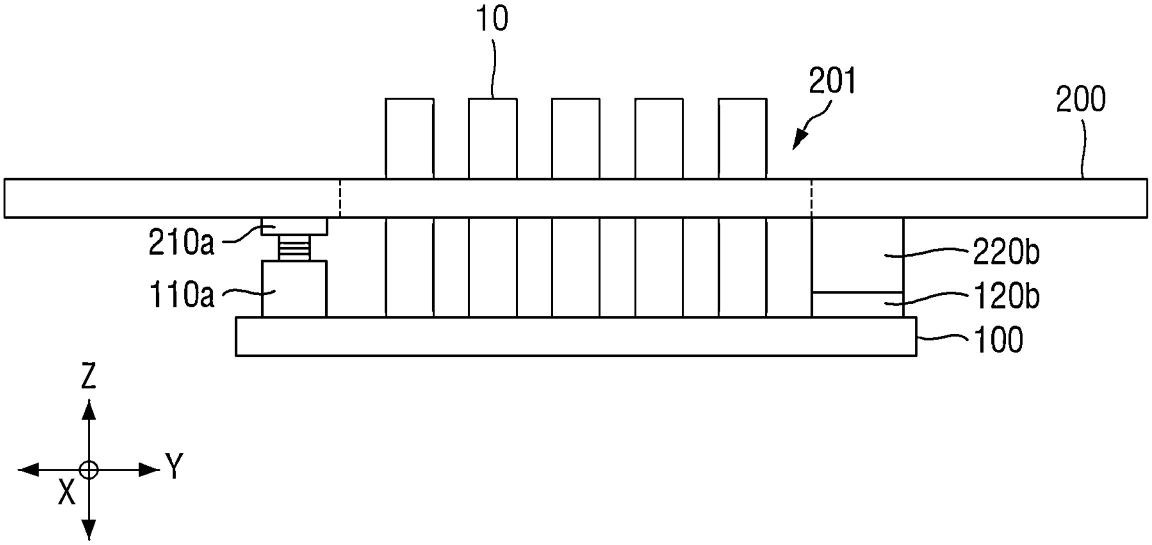
FIG. 4 is a side view of the droplet discharging device of FIG. 1.

FIG. 1 is a diagram describing a droplet discharging device according to some embodiments of the present disclosure. FIG. 2 is a top plan view of a base illustrated in FIG. 1. FIG. 3 is a bottom view of a pack holder illustrated in FIG. 1. FIG. 4 is a side view of the droplet discharging device of FIG. 1.

Referring to FIGS. 1 to 4, a droplet discharging device 1 (or discharging module) according to some embodiments of the present disclosure includes a plurality of heads 10, a base 100, a pack holder 200, guide pins 210*a* and 210*b*, guide holders 110*a* and 110*b*, first fastening parts 220*a* and 22*b*, and second fastening parts 120*a* and 120*b*.

The base 100 is a member that supports the plurality of heads 10. The base 100 may have, for example, a substantially rectangular shape. As illustrated, a short side of the base 100 may be disposed in a first direction X, and a long side thereof may be disposed in a second direction Y. In addition, the base 100 may have a plate shape.

A head fixing region 101 for fixing the plurality of heads 10 is disposed near the center of the base 100. The head fixing region 101 may have, for example, a substantially rectangular shape. As illustrated, a short side of the head fixing region 101 may be disposed in the first direction X, and a long side thereof may be disposed in the second direction Y. For example, five heads 10 may be fixed to the head fixing region 101, but the present disclosure is not limited thereto. Four or less heads 10 may be fixed, or six or more heads 10 may be fixed.

The pack holder 200 is disposed on the base 100, and the base 100 and the pack holder 200 are coupled to each other. The pack holder 200 includes an opening 201 formed in a position corresponding to the head fixing region 101. When the base 100 and the pack holder 200 are coupled to each other, the plurality of heads 10 fixed to the base 100 (i.e., the head fixing region 101) penetrate the opening 201 (see FIG. 4).

Position adjustment members 301 and 302 are installed on the other surface (e.g., an upper surface) of the pack holder 200. The position adjustment members 301 and 302 may move a head pack in the first direction X or the second direction Y, and/or rotate the head pack by theta.

Herein, in order to couple the base 100 and the pack holder 200, the guide pins 210*a* and 210*b* and the first fastening parts 220*a* and 220*b* are installed in the pack holder 200, and the guide holders 110*a* and 110*b* and the second fastening parts 120*a* and 120*b* are installed in the base 100.

Specifically, the guide pins 210*a* and 210*b* and the first fastening parts 220*a* and 220*b* are installed on one surface (e.g., a bottom surface) of the pack holder 200 to protrude towards the base 100. The guide holders 110*a* and 110*b* protrude towards the pack holder 200 and are installed in positions corresponding to the guide pins 210*a* and 210*b* on one surface (e.g., an supper surface) of the base 100, and the second fastening parts 120*a* and 120*b* are installed in positions corresponding to the first fastening parts 220*a* and 220*b*. The guide pins 210*a* and 210*b* are fastened to the guide holders 110*a* and 110*b*, and the first fastening parts 220*a* and 220*b* are fastened to the second fastening parts 120*a* and 120*b*.

As illustrated in FIG. 2, the two guide holders 110*a* and 110*b* and the two second fastening parts 120*a* and 120*b* may be installed in the base 100. For example, the second fastening parts 120*a* and 120*b* are installed close to the corner (i.e., the short side) of the rectangular head fixing part 101 when compared to the guide holders 110*a* and 110*b*.

The guide holders 110*a* and 110*b* are installed close to an apex of the rectangular head fixing part 101 when compared to the second fastening parts 120*a* and 120*b*. Specifically, as illustrated, the two guide holders 110*a* and 110*b* may be installed close to two apexes disposed in a diagonal direction among four apexes of the head fixing region 101. While this is not illustrated separately, whenever there are four guide holders, each of the four guide holders may be installed close to four apexes of the head fixing region 101.

As illustrated in FIG. 3, the two guide pins 210*a* and 210*b* and the two first fastening parts 220*a* and 220*b* may be installed in the pack holder 200. For example, the first fastening parts 220*a* and 220*b* are installed close to the corner (i.e., the short side) of the rectangular opening 201 when compared to the guide pins 210*a* and 210*b*.

The guide pins 210*a* and 210*b* are installed close to apexes of the rectangular opening 201 when compared to the first fastening parts 220*a* and 220*b*. Specifically, as illustrated, the two guide pins 210*a* and 210*b* may be installed close to two apexes disposed in a diagonal direction among four apexes of the opening 201. While this is not illustrated separately, whenever there are four guide pins, each of the four guide pins may be installed close to four apexes of the opening 201.

Meanwhile, the guide holders 110*a* and 110*b* may be pressure latches in which release buttons 115*a* and 115*b* are installed. The guide pins 210*a* and 210*b* are fastened to holes in the pressure latches. A user may separate the guide pins 210*a* and 210*b* from the pressure latches by pressing the release buttons 115*a* and 115*b*. The coupling/separation of the guide pins 210*a* and 210*b* and the pressure latch will be described below with reference to FIGS. 5 and 6. The fastening between the guide holders 110*a* and 110*b* and the guide fins 210*a* and 210*b* may be to determine positions of the base 100 and the pack holder 200 before fastening the first fastening parts 220*a* and 220*b* and the second fastening parts 120*a* and 120*b*. As illustrated, the release buttons 115*a* and 115*b* are installed to be exposed to a bottom surface of the base 100. Accordingly, an operator can easily press the exposed release buttons 115*a* and 115*b* to separate the guide pins 210*a* and 210*b* from the pressure latches.

In addition, the base 100 and the pack holder 200 are firmly coupled to each other by the first fastening parts 220*a* and 220*b* and the second fastening parts 120*a* and 120*b*. A lock air is supplied to one of the first fastening parts 220*a* and 220*b* and the second fastening parts 120*a* and 120*b*, thus fastening the first fastening parts 220*a* and 220*b* and the second fastening parts 120*a* and 120*b*. The drawing illustrates case in which the first fastening parts 220*a* and 220*b* are air clamps provided with the lock air, while the second fastening parts 120*a* and 120*b* are clamping blocks coupled to the air clamps, but the present disclosure is not limited thereto. In other words, the second fastening parts 120*a* and 120*b* may be air clamps, while the first fastening parts 220*a* and 220*b* may be clamping blocks. As follows will be described a case in that the first fastening parts 220*a* and 220*b* are air clamps and the second fastening parts 120*a* and 120*b* are clamping blocks.

In the case of conventional inkjet facilities, since a U-shaped base has a shape surrounding a plurality of heads, heat is transmitted to the head via the base. In addition, considering that a convection heat is trapped in the space between the base and the plurality of heads, it cannot escape to the outside. The alignment of the plurality of heads could be twisted by such heat.

However, in the droplet discharging device 1 (or discharging module) according to some embodiments of the present disclosure, since the base does not surround the plurality of heads 10, the heat is not well transmitted to the head via the base. Furthermore, the convection heat can easily escape to the surroundings. Accordingly, this can reduce the occurrence of misalignment of the plurality of heads.

Figure 5:
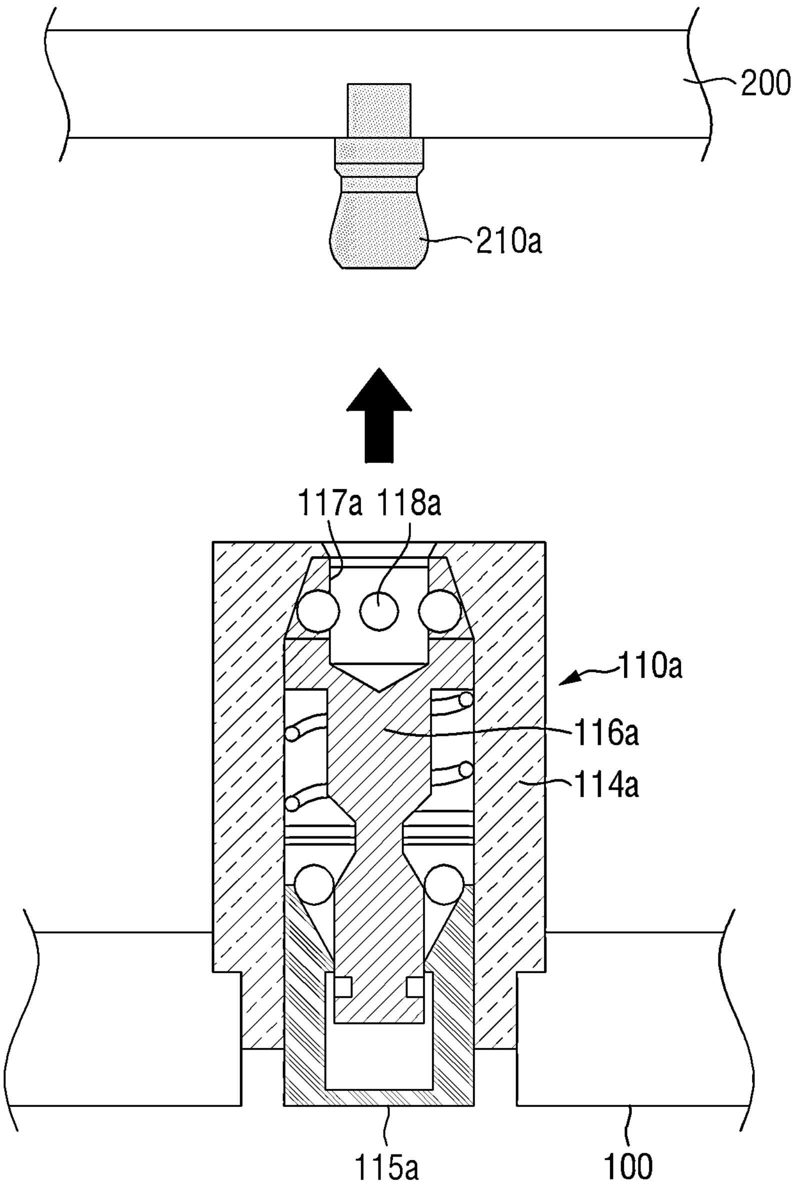
FIGS. 5 and 6 are diagrams describing an operation of fastening the guide pin and the guide holder illustrated in FIG. 1.
Figure 6:
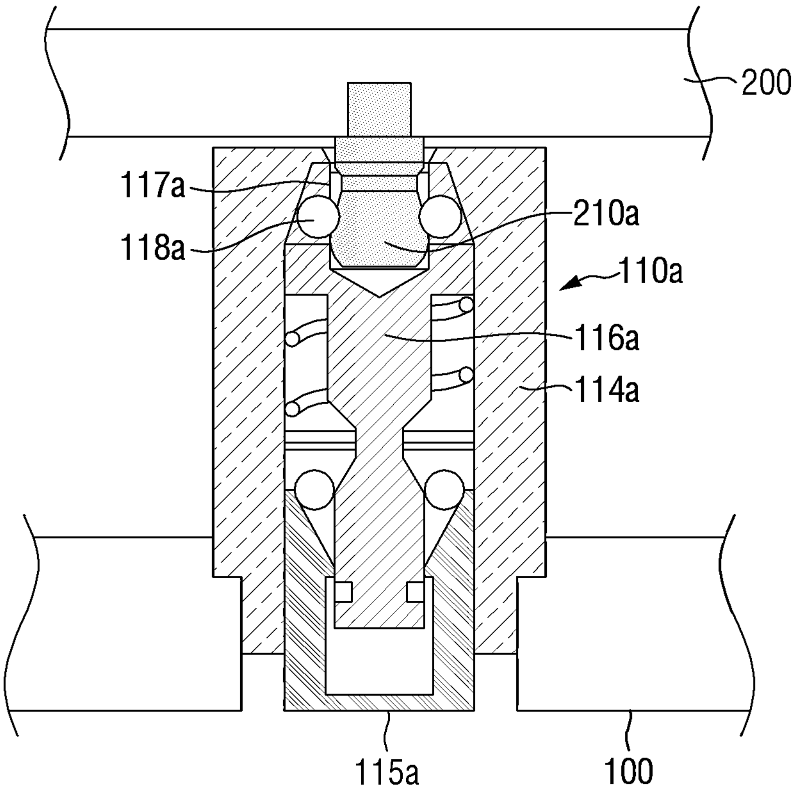

FIGS. 5 and 6 are diagrams describing an operation of fastening the guide pin and the guide holder illustrated in FIG. 1.

First, referring to FIG. 5, a guide pin 210*a* is installed in the pack holder 200, and the guide holder 110*a* is installed in the base 100.

The guide holder 110*a* is a pressure latch and includes a holder body 114*a* fixed to the base 100, a hole 117*a* installed in a tip region of the holder body 114*a*, a ball 118*a* installed on a sidewall (i.e., an inner circumferential side) of the hole 117*a*, a rod 116*a* installed in the holder body 114*a*, and a release button 115*a* connected to the rod 116*a*.

The pack holder 200 and the base 100 are approached by aligning the positions of the guide pin 210*a* and the guide holder 110*a*. Although FIG. 5 illustrates that the base 100 is moved in the direction of the pack holder 200, the present disclosure is not limited thereto.

As illustrated in FIG. 6, the guide pin 210*a* is inserted into the hole 117*a* of the guide holder 110*a* and is fixed by the ball 118*a* installed on the inner circumferential side of the hole 117*a*.

Figure 7:
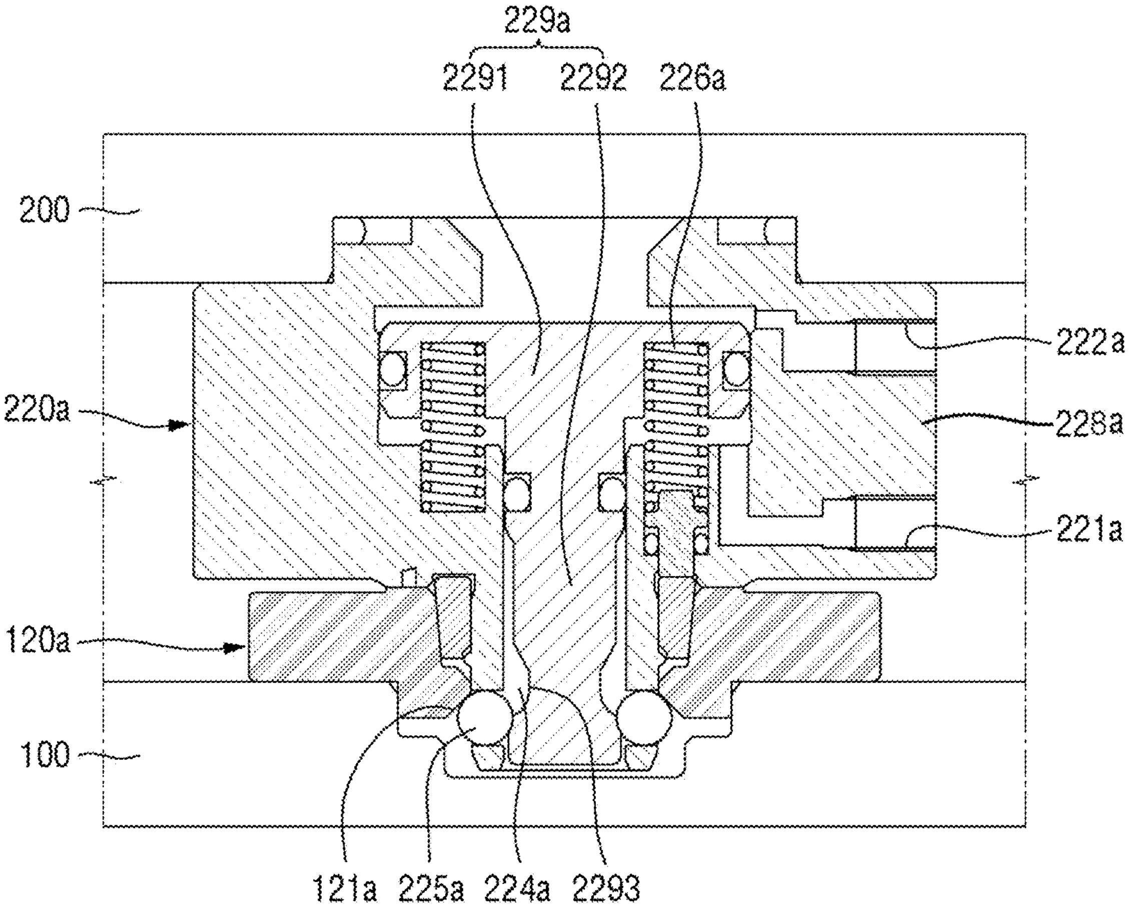
FIGS. 7 and 8 are diagrams describing an operation of fastening the first fastening part and the second fastening part illustrated in FIG. 1.
Figure 8:
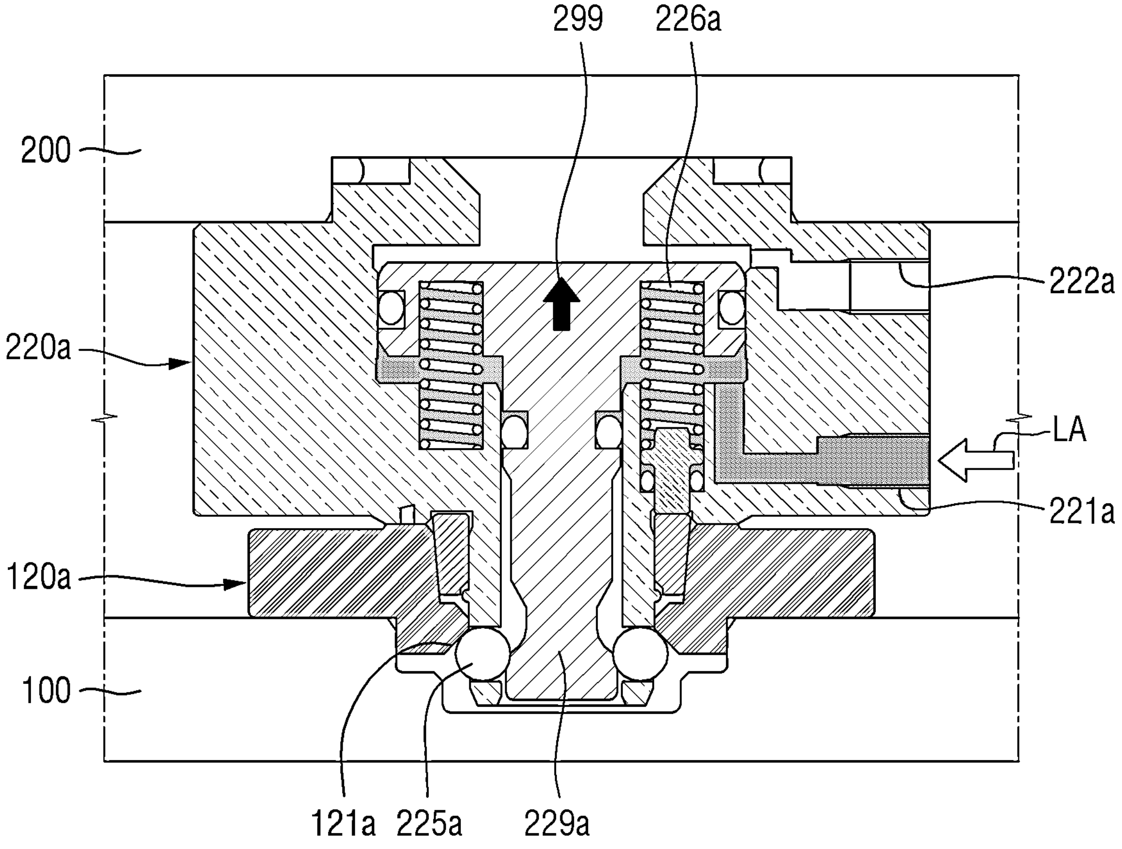

FIGS. 7 and 8 are diagrams describing an operation of fastening the first fastening part and the second fastening part illustrated in FIG. 1.

First, referring to FIG. 7, the first fastening part 220*a* is installed in the pack holder 200, and the second fastening part 120*a* is installed in the base 100. The first fastening part 220*a* may be the air clamp, and the second fastening part 120*a* may be the clamping block.

The first fastening part 220*a* includes a body 228*a*, a piston rod 229*a*, a spring 226*a*, a lock port 221*a*, and a release port 222*a*.

The body 228*a* has a hole 224*a* formed in one side thereof. The piston rod 229*a* is disposed in the body 228*a*, and includes a support region 2291 and a rod region 2292 connected to the support region 2291 and penetrating the hole 224*a*. A groove 2293 is formed in the rod region 2292. A steel ball 225*a* is installed in the body 228*a* (i.e., near the hole 224*a*), and the position of the steel ball 225*a* may vary according to the position of the piston rod 229*a*. The spring 226*a* is installed in the body 228*a* and is installed between an inner wall of the body 228*a* and the support region 2291. The lock port 221*a* is installed in the body 228*a* and is meant to supply the lock air to the support region 2291. In addition, the release port 222*a* is installed in the body 228*a* and is meant to supply a release air to the support region 2291.

Meanwhile, as described above, when the pack holder 200 and the base 100 are approached by aligning the positions of the guide pins 210*a* and 210*b* and the guide holders 110*a* and 110*b*, the guide pins 210*a* and 210*b* and the guide holders 110*a* and 110*b* are fastened to each other. In that case, as shown in FIG. 7, the first fastening part 220*a* and the second fastening part 120*a* are temporarily fastened to each other. During the temporary fastening, as the rod region 2292 of the piston rod 229*a* pushes the steel ball 225*a* outwards, the steel ball 225*a* is in contact with a seating surface 121*a* of the second fastening part 120*a*. However, there may be an appropriate gap between the steel ball 225*a* and the seating surface 121*a*.

Referring to FIG. 8, when the lock air LA is supplied via the lock port 221*a*, the piston rod 229*a* is lowered (see reference numeral 299) by the pressure of the lock air LA and the pressure by the spring 226*a*, and the steel ball 225*a* thus comes in close contact with the seating surface 121*a*. The piston rod 229*a* is moved in the direction of reducing an elastic force of the spring. In this way, the first fastening part 220*a* and the second fastening part 120*a* are fastened to each other.

Figure 9:
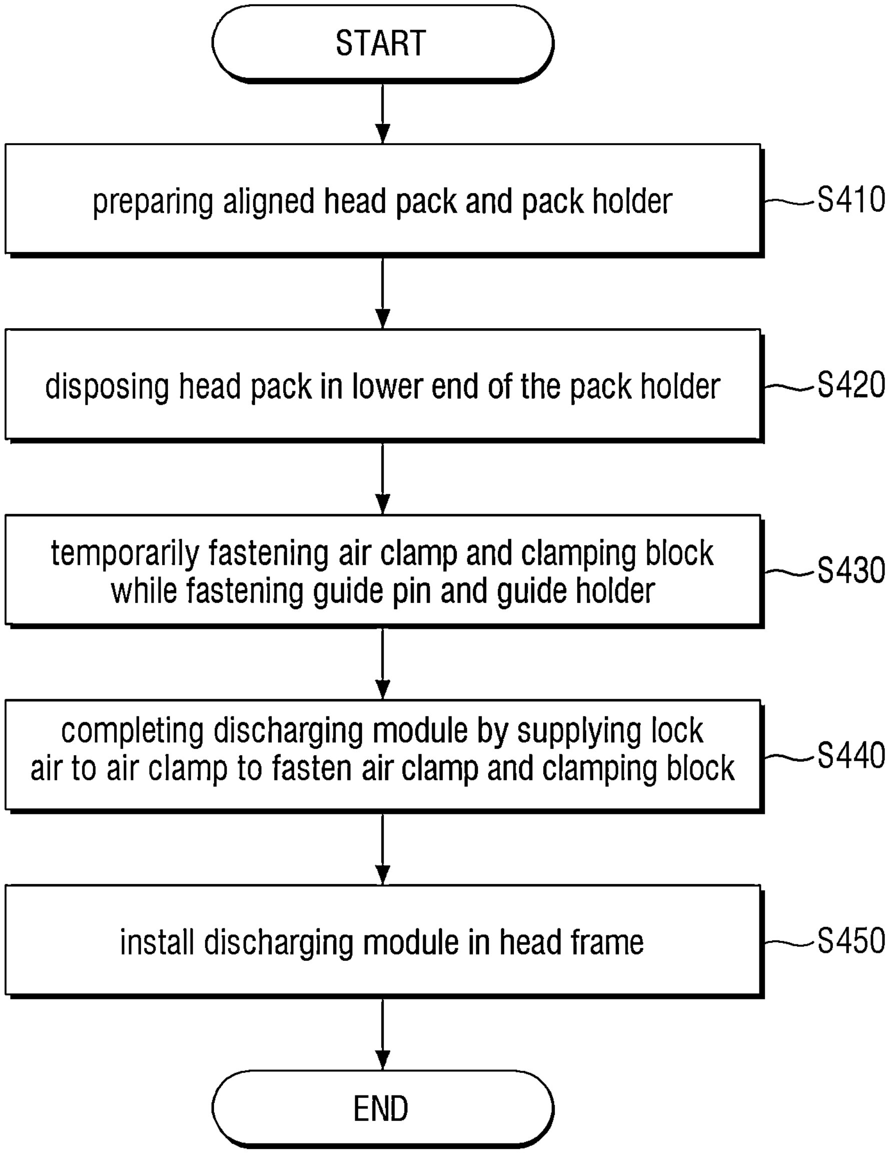
FIG. 9 is a flowchart describing a manufacturing method according to one embodiment of the present disclosure.
Figure 10:
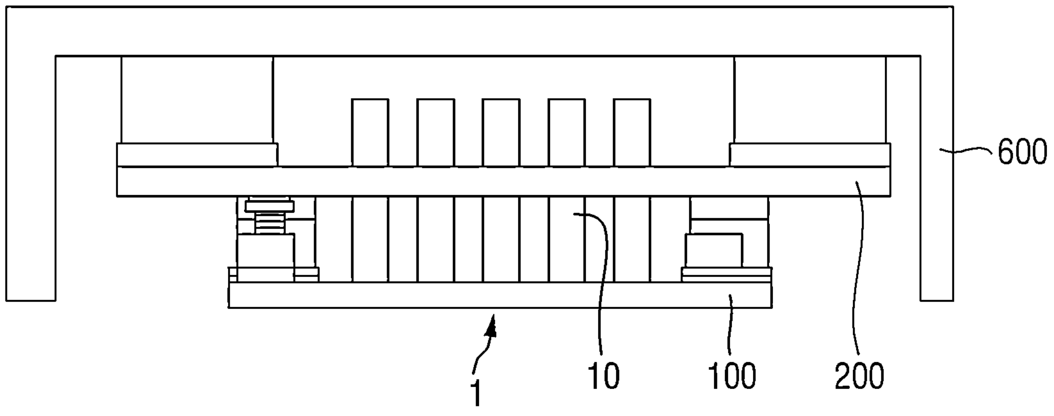
FIG. 10 is a diagram describing step S450 of FIG. 9.

FIG. 9 is a flowchart describing a manufacturing method according to one embodiment of the present disclosure. FIG. 10 is a diagram describing step S450 of FIG. 9. Hereinafter, it will be described that the first fastening part is the air clamp and the second fastening part is the clamping block.

Referring to FIG. 9, an aligned head pack and the pack holder 200 are prepared (S410).

Specifically, as described with reference to FIGS. 1 to 3, the head pack including a plurality of aligned heads 10 is fixed to the head fixing region 101 of the base 100, and guide holders 110*a* and 110*b* and clamping blocks 120*a* and 120*b* are installed around the head fixing region 101 of the base 100. In the pack holder 200, the opening 201 is installed, where the guide pins 210*a* and 210*b* and the air clamps 220*a* and 220*b* are installed around the opening 201.

Then, the head pack is disposed in a lower end of the pack holder 200 (S420).

In addition, the air clamps 220*a* and 220*b* and the clamping blocks 120*a* and 120*b* are temporarily fastened (manually) to each other while fastening the guide pins 210*a* and 210*b* to the guide holders 110*a* and 110*b* (S430).

Specifically, as described with reference to FIGS. 5 and 6, the guide pin (e.g., 210*a*) is fixed by the ball 118*a* installed on the inner circumferential side of the hole 117*a* of the guide holder (e.g., 110*a*). As described with reference to FIG. 7, when the guide pin 210*a* is fastened to the guide holder 110*a*, the rod region 2292 of the air clamp (e.g., 220*a*) pushes the steel ball 225*a* outwards, and the steel ball 225*a* is in contact with the seating surface 121*a* of the clamping block (e.g., 120*a*).

Then, the lock air is supplied to the air clamps 220*a* and 220*b* to completely fasten the air clamps 220*a* and 220*b* and the clamping blocks 120*a* and 120*b*, thus completing the discharging module with secured precision (S440).

Specifically, as described with reference to FIG. 8, when the lock air LA is supplied via the lock port 221*a*, the piston rod 229*a* is moved (see reference numeral 299) by the pressure of the lock air LA and the pressure by the spring 226*a*, and the steel ball 225*a* thus comes in close contact with the seating surface 121*a*.

Then, the discharging module is installed on a head frame (S450). As illustrated in FIG. 10, the discharging module is fixed under the head frame 600. The pack holder 200 is disposed on the base 100. In particular, the release buttons (see 115*a* and 115*b* in FIG. 1) of the guide holders 110*a* and 110*b* are exposed to the bottom surface of the base 100.

Figure 11:
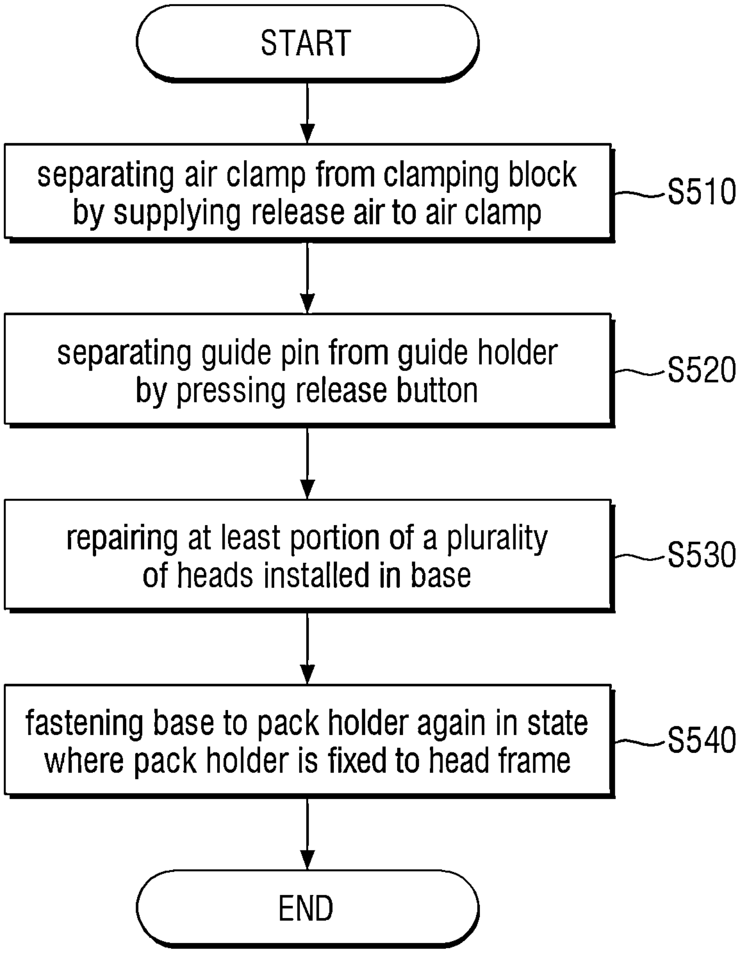
FIG. 11 is a flowchart describing a manufacturing method according to another embodiment of the present disclosure.
Figure 12:
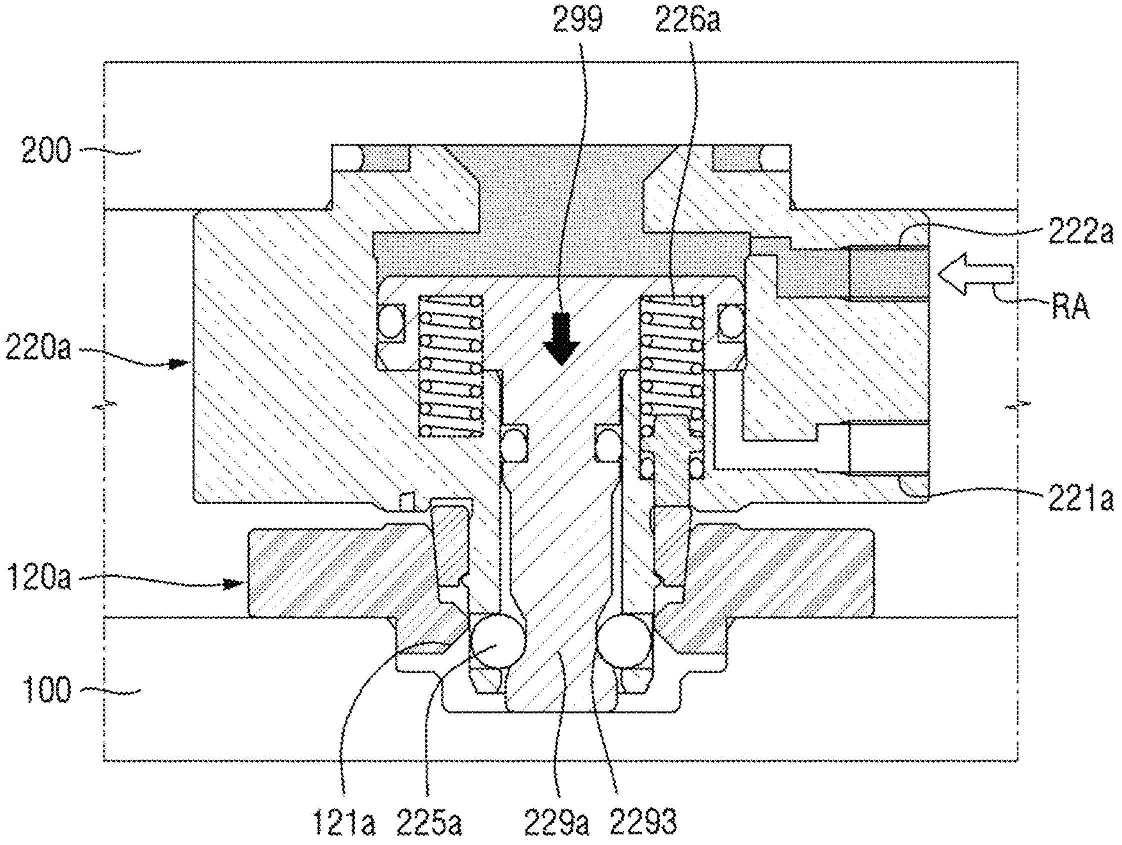
FIG. 12 is a diagram describing step S520 of FIG. 11.
Figure 13:
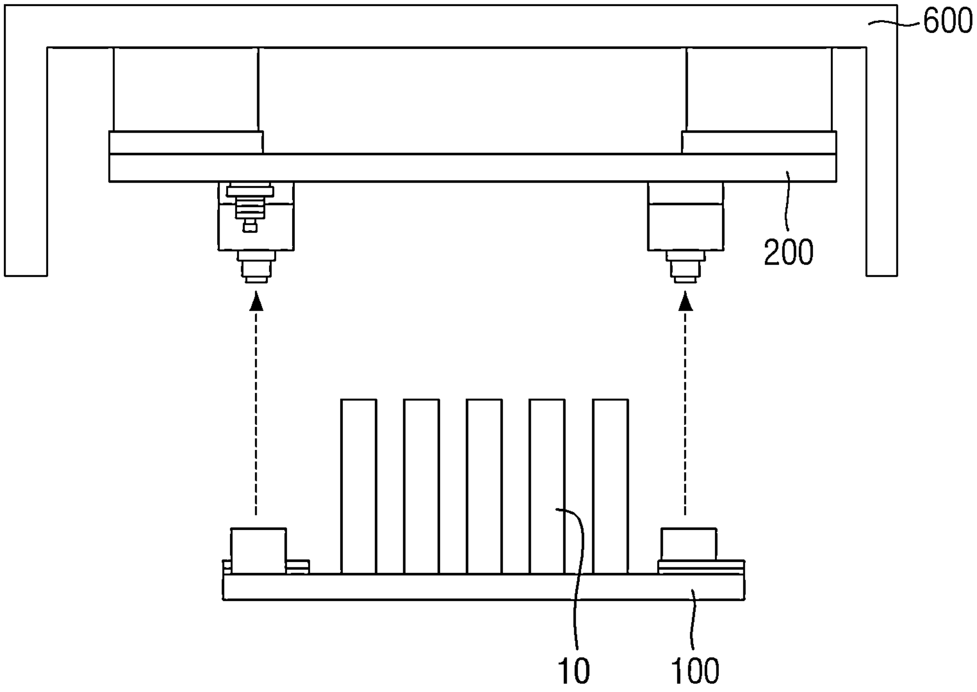
FIG. 13 is a diagram describing step S540 of FIG. 11.

FIG. 11 is a flowchart describing a manufacturing method according to another embodiment of the present disclosure. FIG. 11 is mean to explain an operation of separating and recoupling the base and the pack holder during a maintenance operation of a plurality of packs. FIG. 12 is a diagram describing step S520 of FIG. 11. FIG. 13 is a diagram describing step S540 of FIG. 11

First, referring to FIG. 11, when the maintenance operation of the plurality of packs is required, the user supplies the release air RA to the air clamps 220*a* and 220*b*, thus separating the air clamps 220*a* and 220*b* from the clamping blocks 120*a* and 120*b* (S510).

Specifically, as illustrated in FIG. 12, a release port 222*a* is installed in the air clamp 220*a*. When the release air RA is supplied to the release port 222*a*, the release air RA moves the piston rod 229*a* (see reference numeral 298). When the piston rod 229*a* moves, the steel ball 225*a* deviates from the seating surface 121*a* of the clamping block 120*a* and is settled in the groove 2293 of the piston rod 229*a*. Accordingly, the air clamp 220*a* is completely separated from the clamping block 120*a*.

Then, the guide pins 210*a* and 210*b* and the guide holders 110*a* and 110*b* are separated by pressing the release buttons 115*a* and 115*b* exposed to the bottom surface of the base 100 (S510).

In addition, at least a portion of the plurality of heads installed in the base 100 is repaired or replaced (S530).

Furthermore, in a state where the pack holder 200 is fixed to the head frame 600, the base 100 including the plurality of repaired or replaced heads 10 is fastened to the pack holder 200 again.

Specifically, as illustrated in FIG. 13, the pack holder 200 is not separated from the head frame 600 during the maintenance. Only the base 100 to which the head 10 is fixed may be separated from the pack holder 200 and then repaired.

Even when the base 100 including the plurality of repaired heads 10 is fastened again to the pack holder 200, the air clamps 220*a* and 220*b* and the clamping blocks 120*a* and 120*b* are temporarily fastened while fastening the guide pins 210*a* and 210*b* and the guide holders 110*a* and 110*b*, and the lock air is supplied to the air clamps 220*a* and 220*b*, thus completely fastening the air clamps 220*b* and 220*b* and the clamping blocks 120*a* and 120*b*.

When using the guide pins 210*a* and 210*b*, the guide holders 110*a* and 110*b*, the air clamps 220*a* and 220*b*, and the clamping blocks 120*a* and 120*b*, precision may be maintained regardless of the operator's skill level. In addition, as only the base 100 needs to be separated without separating the pack holder 200 during the maintenance, the maintenance period can be reduced.

Although the embodiments of the present disclosure have been described above with reference to the accompanying drawings, the present disclosure is not limited to the disclosed embodiments, but may be implemented in various different ways, and the present disclosure may be embodied in many different forms without changing technical subject matters and essential features as will be understood by those skilled in the art. Therefore, embodiments set forth herein are exemplary only and not to be construed as a limitation.

What is claimed is:

1. A droplet discharging device, comprising:

a base including a head fixing region to which a plurality of heads are fixed;

a pack holder disposed on the base and including an opening penetrated by the plurality of heads installed on the base;

a guide pin installed on the pack holder and protruding towards the base;

a guide holder installed on the base and fastened to the guide pin;

a first fastening part installed on the pack holder and protruding towards the base; and a second fastening part installed on the base and fastened to the first fastening part, wherein a lock air is supplied to one of the first fastening part and the second fastening part, thus fastening the first fastening part and the second fastening part.

2. The droplet discharging device of claim 1, wherein the first fastening part is an air clamp configured to receive the lock air, and the second fastening part is a clamping block coupled to the air clamp.

3. The droplet discharging device of claim 2, wherein the first fastening part comprises:

a body including a hole formed in one side thereof;

a piston rod disposed in the body and including a support region and a rod region connected to the support region and configured to penetrate the hole;

a spring installed in the body and installed between an inner wall of the body and the support region; and a lock port installed in the body and configured to supply the lock air to the support region, wherein the lock air is supplied via the lock port to move the piston rod in the direction of reducing an elastic force of the spring.

4. The droplet discharging device of claim 3, wherein the first fastening part further comprises a release port installed in the body and configured to supply a release air to the support region, wherein the lock air is supplied via the release port to move the piston rod in the direction of enhancing the elastic force of the spring.

5. The droplet discharging device of claim 1, wherein the guide holder is a pressure latch in which a release button is installed, and the fastened guide pin is separated from the fastened guide holder by pressing the release button.

6. The droplet discharging device of claim 5, wherein the guide holder is installed so that the release button is exposed to the bottom surface of the base.

7. The droplet discharging device of claim 1, wherein there are a plurality of guide holders, the head fixing region is rectangular in shape, and the plurality of guide holders are installed closer to an apex of the head fixing region than the second fastening part.

8. The droplet discharging device of claim 7, wherein the second fastening part is installed closer to the corner of the head fixing region than the guide holder.

9. The droplet discharging device of claim 7, wherein there are two guide holders, and the two guide holders are installed close to two apexes disposed in a diagonal direction among four apexes of the head fixing region.

10. A droplet discharging device, comprising:

a head frame;

a pack holder fixed to the head frame and including an opening;

a base fixed under the pack holder and including a head fixing region provided with a plurality of heads penetrating the opening;

a plurality of guide pins and a plurality of air clamps installed on the pack holder and protruding towards the base; and a plurality of guide holders installed on the base and fastened to the plurality of guide pins, and a plurality of clamping blocks fastened to the plurality of air clamps, wherein the head fixing region is rectangular in shape, the plurality of guide holders are installed closer to an apex of the head fixing region than the clamping blocks, the plurality of clamping blocks are installed closer to the corner of the head fixing region than the guide holders, a lock air is supplied to the air clamp to fasten the air clamp and the clamping block, and a release air is supplied to the air clamp to separate the air clamp from the clamping block.

11. The droplet discharging device of claim 10, wherein the guide holder is a pressure latch in which a release button is installed, and the guide holder is installed so that the release button is exposed to the bottom surface of the base.

12. The droplet discharging device of claim 10, wherein the air clamps comprise:

a body including a hole formed on one side thereof;

a piston rod disposed in the body and including a support region and a rod region connected to the support region and configured to penetrate the hole;

a spring installed in the body and installed between an inner wall of the body and the support region; and a lock port installed in the body and configured to supply the lock air to the support region, wherein the lock air is supplied via the lock port to move the piston rod in the direction of reducing an elastic force of the spring.

13. The droplet discharging device of claim 12, wherein the air clamps further comprise a release port installed in the body and configured to supply a release air to the support region, wherein the lock air is supplied via the release port to move the piston rod in the direction of enhancing the elastic force of the spring.

14. A manufacturing method of a droplet discharging device, comprising:

preparing a head pack including a plurality of heads and a pack holder, wherein the head pack is fixed to a head fixing region of a base, a guide holder and a clamping block are installed around the head fixing region of the base, and an opening is installed in the pack holder and a guide pin and an air clamp are installed around the opening;

disposing the head pack in a lower end of the pack holder;

temporarily fastening the air clamp and the clamping block while fastening the guide pin and the guide holder; and completing a discharging module by supplying a lock air to the air clamp to fasten the air clamp and the clamping block.

15. The manufacturing method of a droplet discharging device of claim 14, further comprising: installing the completed discharging module on a head frame, wherein the pack holder is disposed on the base.

16. The manufacturing method of a droplet discharging device of claim 14, wherein the guide holder is a pressure latch in which a release button is installed, and the guide holder is installed so that the release button is exposed to the bottom surface of the base.

17. The manufacturing method of a droplet discharging device of claim 16, further comprising:

installing the completed discharging module on a head frame by fixing the pack holder to the head frame, wherein the pack holder is disposed on the base;

in a state where the pack holder is fixed to the head frame, supplying a release air to the air clamp to separate the air clamp from the clamping block;

separating the base from the pack holder by pressing the release button to separate the guide pin from the guide holder.

18. The manufacturing method of a droplet discharging device of claim 17, wherein at least a portion of the plurality of heads installed in the base is repaired or replaced, and in a state where the pack holder is fixed to the head frame, the base including the plurality of repaired or replaced heads is fastened to the pack holder again.

* * * * *